US009628129B2

(12) United States Patent
Larsson

(10) Patent No.: US 9,628,129 B2
(45) Date of Patent: Apr. 18, 2017

(54) WATERTIGHT ACCESS COVER WITH ELECTROACTIVE POLYMERS

(71) Applicant: Sony Corporation, Tokyo (JP)

(72) Inventor: Anders Larsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 131 days.

(21) Appl. No.: 14/398,526

(22) PCT Filed: Jan. 14, 2014

(86) PCT No.: PCT/IB2014/000028
§ 371 (c)(1),
(2) Date: Nov. 3, 2014

(87) PCT Pub. No.: WO2015/107376
PCT Pub. Date: Jul. 23, 2015

(65) Prior Publication Data
US 2016/0285496 A1    Sep. 29, 2016

(51) Int. Cl.
| | | |
|---|---|---|
| *H04M 1/18* | (2006.01) | |
| *H04B 1/3888* | (2015.01) | |
| *G06F 1/16* | (2006.01) | |
| *H04B 1/3816* | (2015.01) | |
| *H04M 1/725* | (2006.01) | |
| *F16J 15/06* | (2006.01) | |
| *H04B 1/38* | (2015.01) | |

(52) U.S. Cl.
CPC ......... *H04B 1/3888* (2013.01); *G06F 1/1626* (2013.01); *G06F 1/1656* (2013.01); *H04B 1/3816* (2013.01); *H04M 1/18* (2013.01); *H04M 1/72575* (2013.01); *H04M 1/72583* (2013.01); *F16J 15/064* (2013.01); *H04B 2001/3894* (2013.01)

(58) Field of Classification Search
CPC ....................................................... H04M 1/18
See application file for complete search history.

(56) References Cited

U.S. PATENT DOCUMENTS

| | | | | |
|---|---|---|---|---|
| 5,349,575 A | * | 9/1994 | Park ........................ | G11B 25/10 369/1 |
| 7,418,278 B2 | * | 8/2008 | Eriksson ............. | H04M 1/0202 277/628 |
| 2004/0230090 A1 | * | 11/2004 | Hegde ................. | A61M 1/1053 600/18 |
| 2006/0195059 A1 | * | 8/2006 | Freyman ........... | A61M 25/0068 604/96.01 |

(Continued)

OTHER PUBLICATIONS

International Search Report and Written Opinion issued in corresponding PCT Application No. PCT/IB2014/000028, mailed Oct. 13, 2014, 10 pgs.

*Primary Examiner* — David Bilodeau
(74) *Attorney, Agent, or Firm* — Tucker Ellis LLP

(57) ABSTRACT

An electronic device includes a housing that has an opening to access a component inside the housing. The electronic device also includes a cover for the opening, a gasket to provide a seal between the cover and the opening, and a voltage source to supply voltage to the gasket. The gasket is configured to alter its shape, from a normal state that blocks opening of the cover to an activated state that permits opening of the cover, when voltage is applied to the gasket.

17 Claims, 10 Drawing Sheets

(56) References Cited

U.S. PATENT DOCUMENTS

| | | |
|---|---|---|
| 2006/0260838 A1 | 11/2006 | Ariel |
| 2007/0053684 A1* | 3/2007 | Iwasaki .................... G03B 9/06 396/505 |
| 2008/0061518 A1 | 3/2008 | Gilliland et al. |
| 2015/0086062 A1* | 3/2015 | Schrems ................. H04M 1/15 381/384 |

* cited by examiner

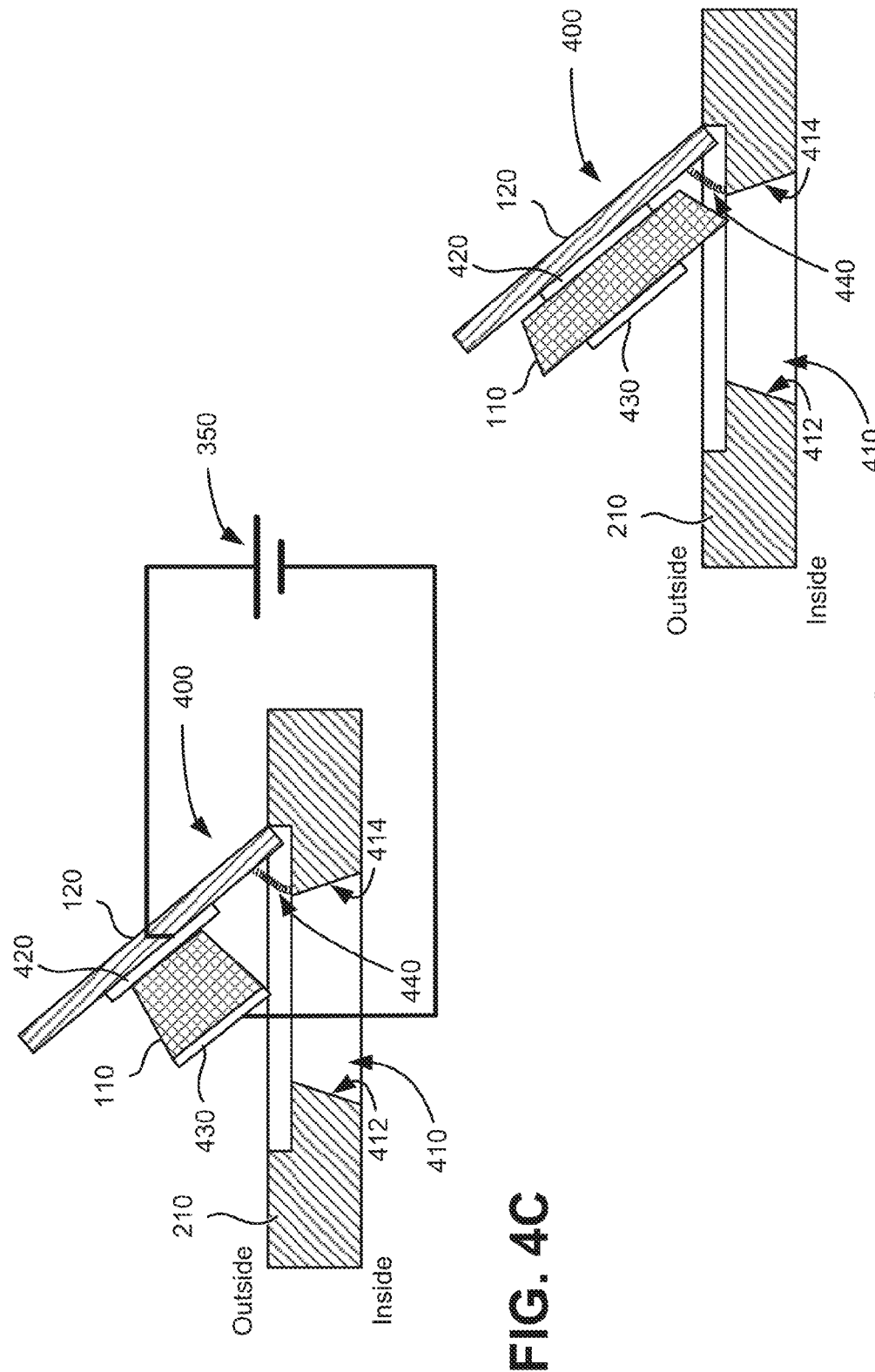

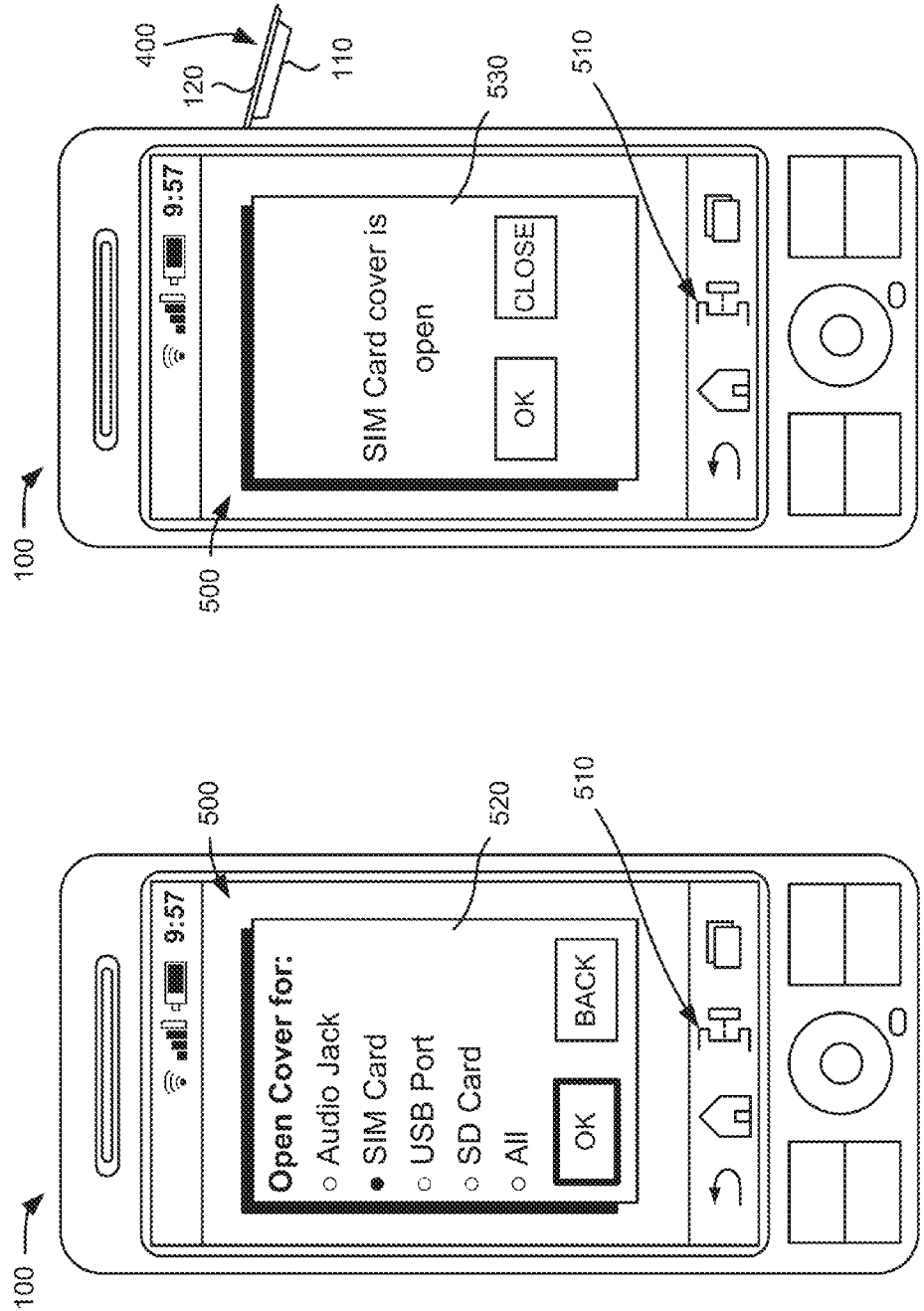

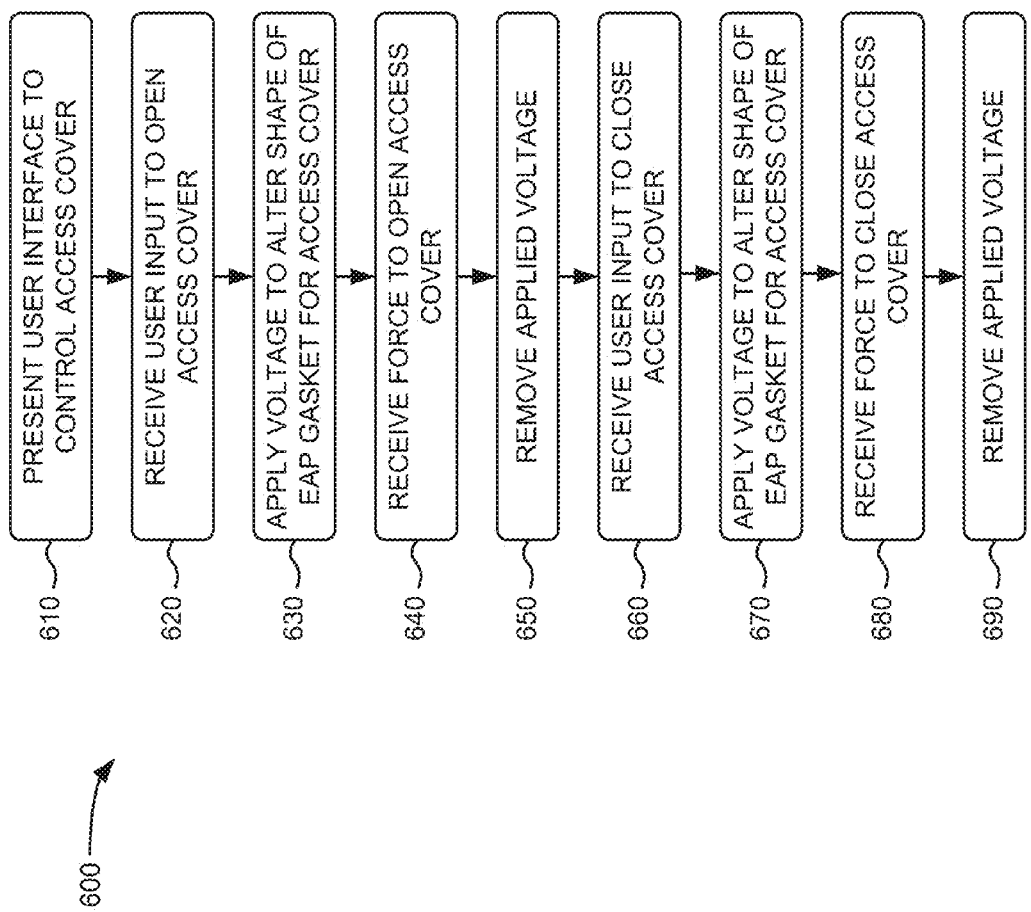

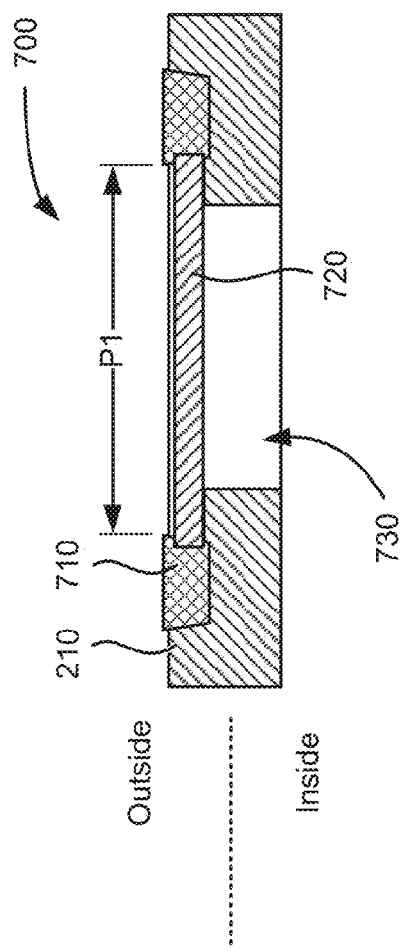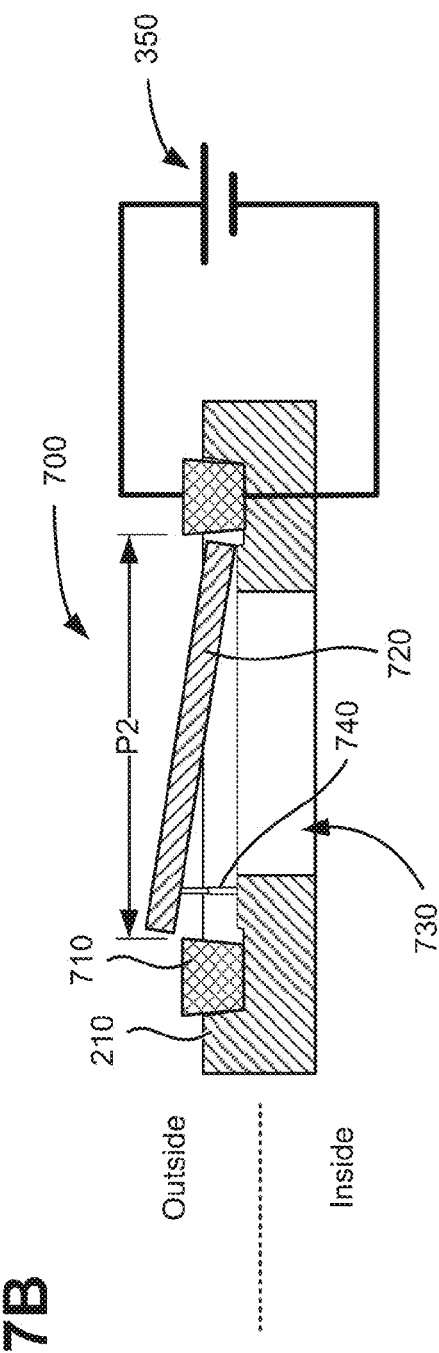
FIG. 7A
FIG. 7B

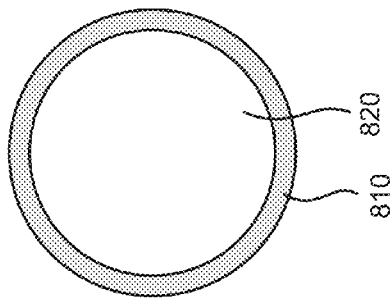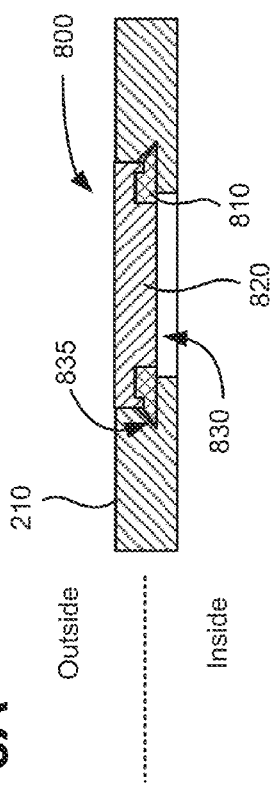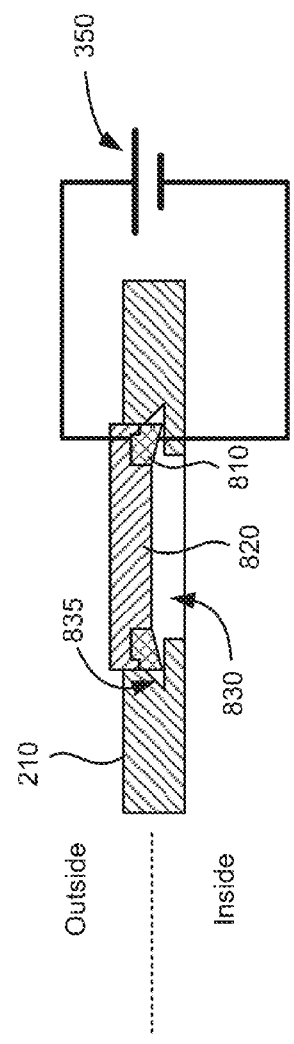

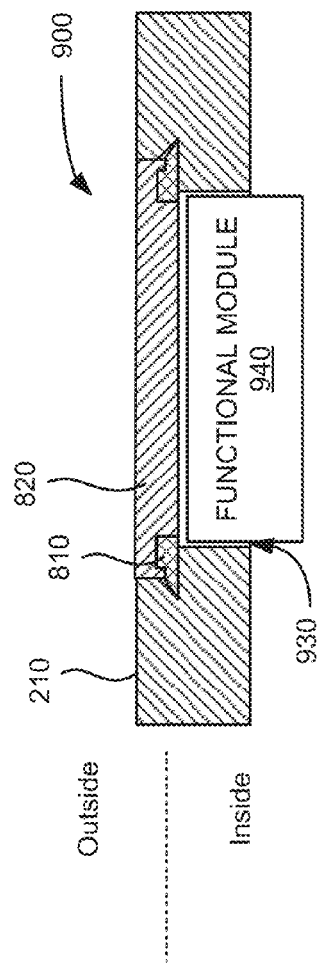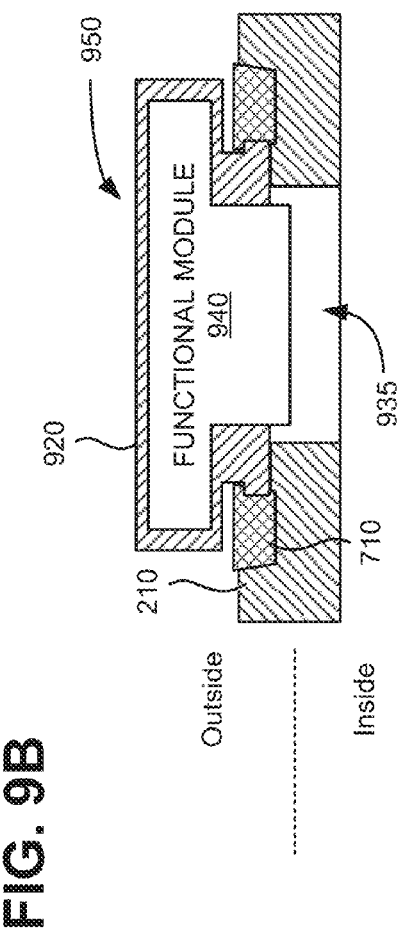

WATERTIGHT ACCESS COVER WITH ELECTROACTIVE POLYMERS

TECHNICAL FIELD OF THE INVENTION

This invention relates generally to access covers and, more particularly, to watertight access covers for electronic devices.

DESCRIPTION OF RELATED ART

Some electronic devices, such as smart phones and other mobile electronic devices, are sold as waterproof devices. A difficult problem to solve in the design of a waterproof mobile device is how to seal functions and interfaces that needs to be accessible from outside the device. Such interfaces may include a charging port, card readers, universal serial bus (USB) connectors, audio jacks, etc. If water or other liquids enter these sensitive opening, the mobile device can be damaged due to a short circuit.

SUMMARY

According to one aspect, an electronic device may include a housing that includes an opening to access a component inside the housing; a cover for the opening; and a gasket to provide a seal between the cover and the opening. The gasket may be configured to alter shape, from a normal state that blocks opening of the cover to an activated state that permits opening of the cover, when voltage is applied to the gasket. The electronic device also includes a voltage source to supply voltage to the gasket.

Additionally, the gasket may include an electro active polymer (EAP).

Additionally, when in the normal state, the gasket may be configured to provide a watertight seal within the opening.

Additionally, the electronic device may include a user interface configured to receive a selection from a user to open the cover. The user selection may be configured to trigger application of voltage from the voltage source.

Additionally, the gasket may be secured to the cover and may be configured to move with the cover between an open position and a closed position.

Additionally, the cover may include an electrode configured to supply voltage to the gasket.

Additionally, the gasket and the opening may be configured to prevent opening of the cover when the gasket is both within the opening and in the normal state.

Additionally, the electronic device may include a spring to force the cover and gasket away from the opening when the gasket is in the activated state.

Additionally, wherein the gasket may be secured to the housing and may be separated from the cover when the cover is opened.

Additionally, the opening may include one or more of an audio jack, a USB port, a subscriber identity module (SIM) card slot, a memory card slot, or a cavity for receiving a functional module.

According to another aspect, a method performed by an electronic device may include receiving, via a user interface, a selection to open an access cover for an opening to the electronic device; applying voltage to alter a shape or size of a gasket for the access cover, wherein the shape or size of the gasket may be altered from a normal state that blocks opening of the access cover to an activated state that permits opening of the access cover; and applying, while the voltage is being applied to alter the shape or size of the gasket, a force to remove the access cover from the opening.

Additionally, the method may further include presenting, to the user and via the user interface, options to identify the access cover from a selection of multiple access covers.

Additionally, the method may further include removing, after the force to remove the access cover has been applied, the voltage to alter the shape or size of the gasket for the access cover, wherein the shape or size of the gasket is altered from the activated state that permits opening of the access cover to the normal state that blocks opening of the access cover.

Additionally, the method may further include receiving, from the user and via the user interface, another selection to close the access cover; applying voltage to alter the shape or size of the gasket, wherein the shape or size of the gasket is altered from the normal state to the activated state; and receiving, while the voltage is being applied to alter the shape or size of the gasket, a force to insert the access cover onto the opening.

Additionally, the gasket may include an electroactive polymer.

According to yet another aspect, a device, may include a housing that includes an opening to access a component inside the housing; a cover for the opening; a gasket to provide a seal between the cover and the opening, wherein the gasket comprises an electroactive polymer material configured to alter a shape or size, from a normal state that blocks opening of the cover to an activated state that permits opening of the cover, when voltage is applied to the gasket; and an electrode to connect the gasket to a voltage source to selectively supply voltage to the gasket.

Additionally, the device may further include a memory to store instructions and a processor. The processor may be configured to present, to a user and via a user interface, a menu option to open the cover; receive, via the user interface, a selection to open the cover; and apply voltage, from the voltage source, to alter the shape or size of a gasket from the normal state to the activated state.

Additionally, the processor may be further configured to present, to a user and via a user interface, options to identify the access cover from a group of multiple access covers.

Additionally, the processor may be further configured to monitor a status of the cover as one of opened or closed.

Additionally, the device may include one of a mobile telephone, a tablet computer, a laptop computer, a personal digital assistant (PDA), a gaming device, a personal music playing device, a Global Positioning System (GPS) device, a digital camera, or a two-way radio device.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIGS. 4A-4D are simplified schematics illustrating use of a watertight access cover according to an implementation described herein;

FIGS. 5A-5B are diagrams of an exemplary user interface that may be presented to control a watertight access cover according to an implementation described herein;

FIG. 6 is a flowchart of an exemplary process for controlling a watertight access cover according to an implementation described herein;

FIGS. 7A-7B are simplified schematics illustrating use of a watertight access cover according to another implementation described herein;

FIGS. 8A-8C are simplified schematics illustrating use of a watertight access cover according to still another implementation described herein; and FIGS. 9A-9B are simplified schematics illustrating a watertight access cover according to a further implementation described herein.

DETAILED DESCRIPTION

The following detailed description refers to the accompanying drawings. The same reference numbers in different drawings may identify the same or similar elements.

Figure 1:
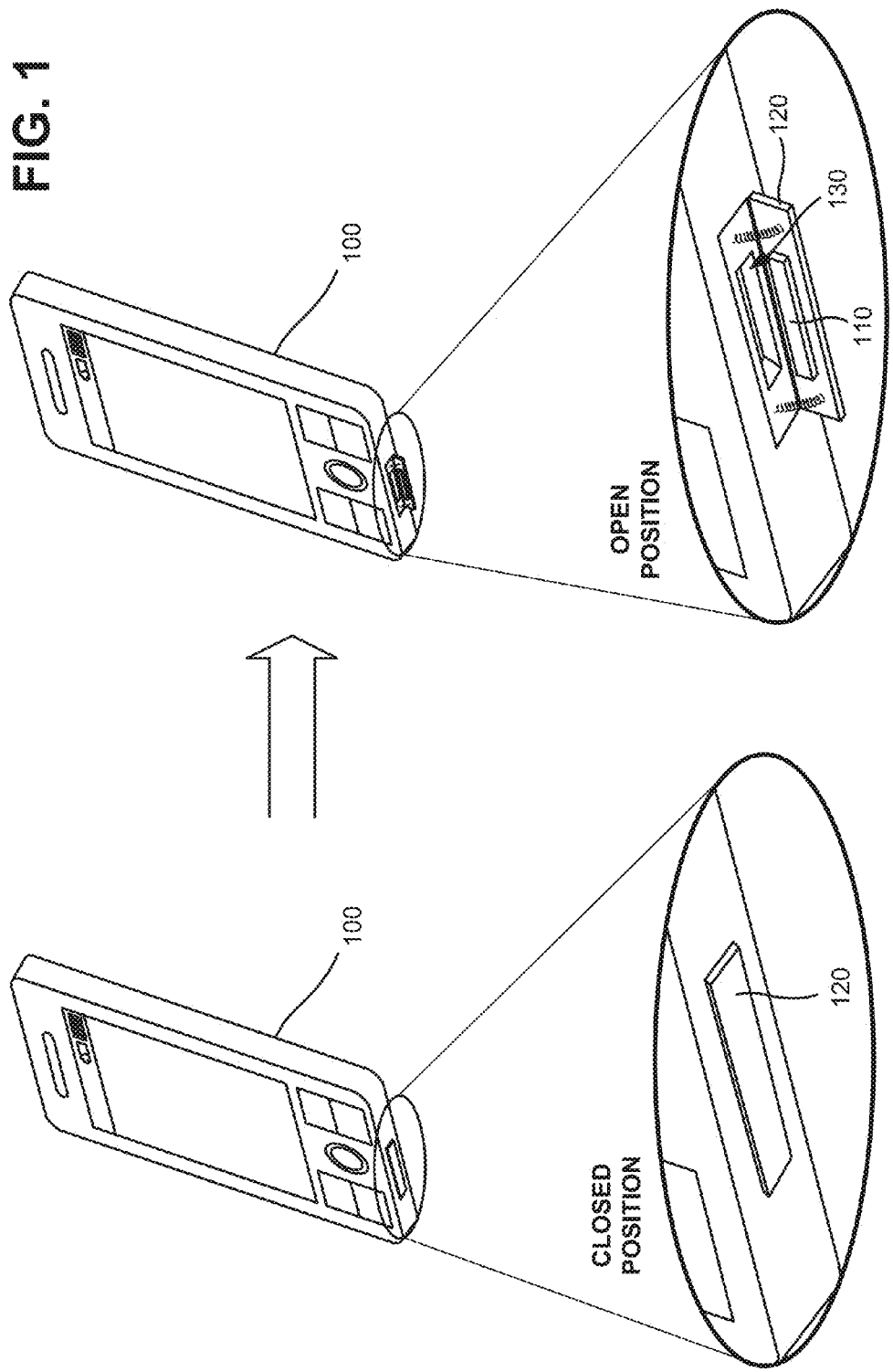
FIG. 1 illustrates a concept described herein.

Systems and methods described herein provide a watertight seal for an opening of an electronic device. FIG. 1 illustrates a concept described herein. In one implementation, a gasket 110 that changes shape may be mounted on a door (or cover) 120 of an opening 130 of an electronic device 100. Gasket 110 may be formed of an electro-active polymer (EAP) that changes dimensions and geometry when voltage is applied across the gasket. In a normal state (e.g., when voltage is not applied), gasket 110 may be configured to be slightly larger than opening 130 so as to form a seal in opening 130 when door 120 is in a closed position. As described further herein, opening 130 and the normal state of the gasket 110 may also be configured so that the normal state of the gasket locks door 120 in place when door 120 is closed with gasket 110 in opening 130. In an activated state (e.g., when voltage is applied), gasket 110 may be configured to change dimensions and shape to release the seal in opening 130 and unlock door 120. Particularly, the cross-sectional area of gasket 120 may be reduced to a size smaller than that of opening 130 to permit door 120 to swing open. Door 120 may be opened, for example, using a spring-activated force that opens door 120 when the gasket 110 size changes to unlock door 120.

In one implementation, voltage to activate gasket 110 may be applied from a source within electronic device 100. Upon a signal from a user, electronic device 100 may apply voltage to gasket 110 for a short period of time (e.g., less than one to five seconds) to activate gasket 110. The activated gasket 110 may unlock door 120 and unseal opening 130. After door 120 is opened, the applied voltage may be removed and gasket 110 may return to a normal state. Another signal from a user may be provided when the user is ready to close door 120. Upon receiving the signal to close, electronic device 100 may again apply voltage to gasket 110 for another short period of time to activate gasket 110. A manual or automated force may be applied to door 120 while gasket 110 is in the activated state to close door 120 and allow gasket 110 to re-seal opening 130 when the voltage is removed and gasket 110 returns to a normal state inside opening 130.

Figure 2:
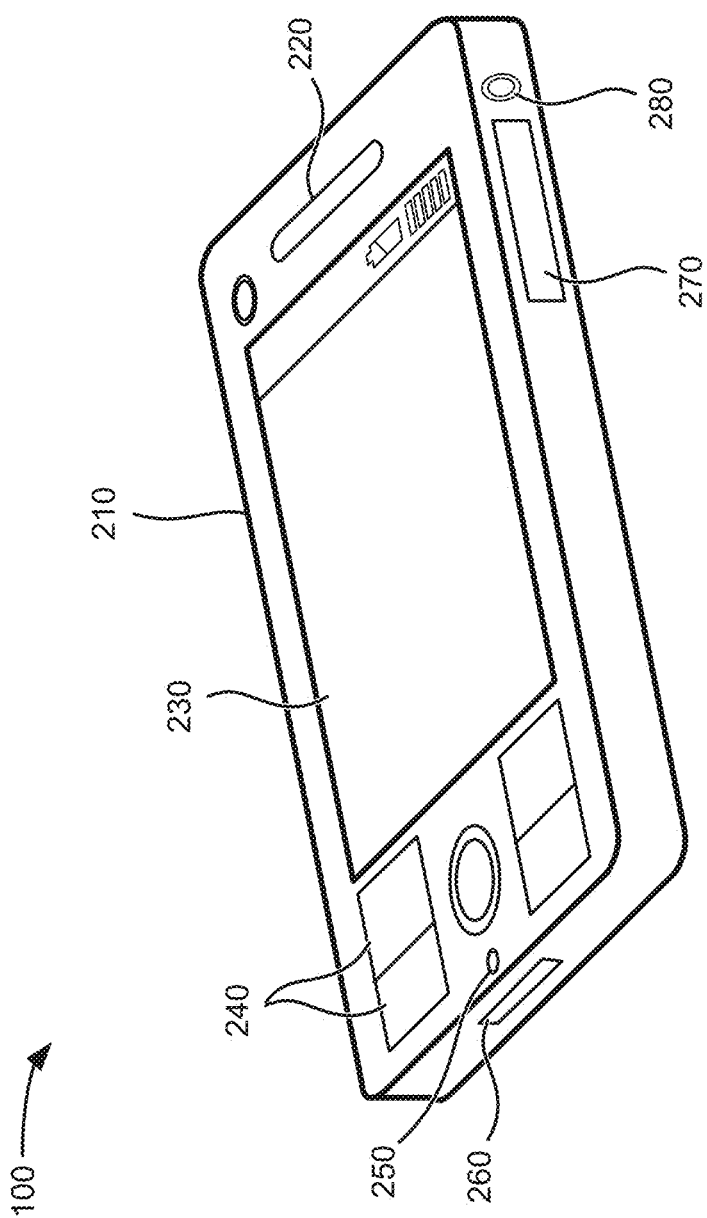
FIG. 2 is a diagram of an exemplary electronic device that may implement embodiments described herein.

FIG. 2 is a diagram of an exemplary electronic device 100 that may implement embodiments described herein. Although electronic device 100 is depicted in FIG. 2 as a mobile phone, electronic device 100 may include any of the following devices: a mobile telephone; a tablet, desktop, laptop, or personal computer; a personal digital assistant (PDA); a gaming device or console; a personal music playing device; a Global Positioning System (GPS) device; a digital camera; a two-way radio (e.g., walkie-talkie) device; or another type of computational or communication device. Generally, electronic device 100 may include any device, in which it may be desirable to incorporate sealed openings, that can provide a user interface to selectively activate a voltage source for an EAP gasket.

As shown in FIG. 2, electronic device 100 may include a housing 210, a speaker 220, a display 230, control keys 240, a microphone 250, a universal serial bus (USB) port 260, a slot 270 for removable memory card, and/or a audio port 280. Housing 210 may provide a casing for components of electronic device 100 and may protect the components from outside elements. In one implementation, housing 210 may generally provide a water-resistant barrier for other components of electronic device 100. Speaker 220 may provide audible information to a user of electronic device 100. Display 230 may provide visual information to the user, such as the image of a caller, text, menus, video images, or pictures. In one implementation, display 230 may also include touch-sensitive components to enable display 230 to receive user input. Control keys 240 may permit the user to interact with electronic device 100 to cause it to perform one or more operations, such as place or receive a telephone call. Microphone 250 may receive sound, e.g., the user's voice during a telephone call.

USB access port 260 may provide a connection point for an external USB cable. Slot 270 may provide an opening to receive a removable memory card. When the removable memory card is inserted into electronic device 100, electronic device 100 may read data files or execute applications, for example. Audio port 280 may include a port to receive a jack to, for example, divert sound from speaker 220 to an external earpiece, speaker, or headphone set.

USB access port 260, slot 270, and/or audio port 280 generally include openings in housing 210 to access internal components of electronic device 100. If water or other liquids reach these sensitive openings, electronic device 100 will be damaged due to a short circuit. Conventionally, openings such as USB access port 260, slot 270, and/or audio port 280 can be protected with rubber gaskets (or other flexible materials) that are pressed into the corresponding opening in housing 210. There are several problems with conventional gaskets that limit their long-term effectiveness. Such problems include gasket wear that eventually lead to a poor seal. Also, sand or dust particles can adhere to the rubber gasket, preventing a complete seal. In some cases, a user may fail to properly or fully close a door/gasket over an opening, leaving an ineffective seal. In other cases, the geometry of the rubber seal may be difficult to align so that the seal stays in place.

According to implementations described herein, openings for USB access port 260, slot 270, and/or audio port 280 may be provided with watertight access covers. The watertight access covers may include a door (or cover) with a gasket to provide a seal between the door and the opening. The gasket may be configured to alter shape, from a normal state that blocks opening of the door to an activated state that permits opening of the door, when voltage is applied to the gasket. While watertight access covers for USB access port 260, slot 270, and/or audio port 280 are particularly described, embodiments described herein may be used for watertight openings for any electrical interface.

Figure 3:
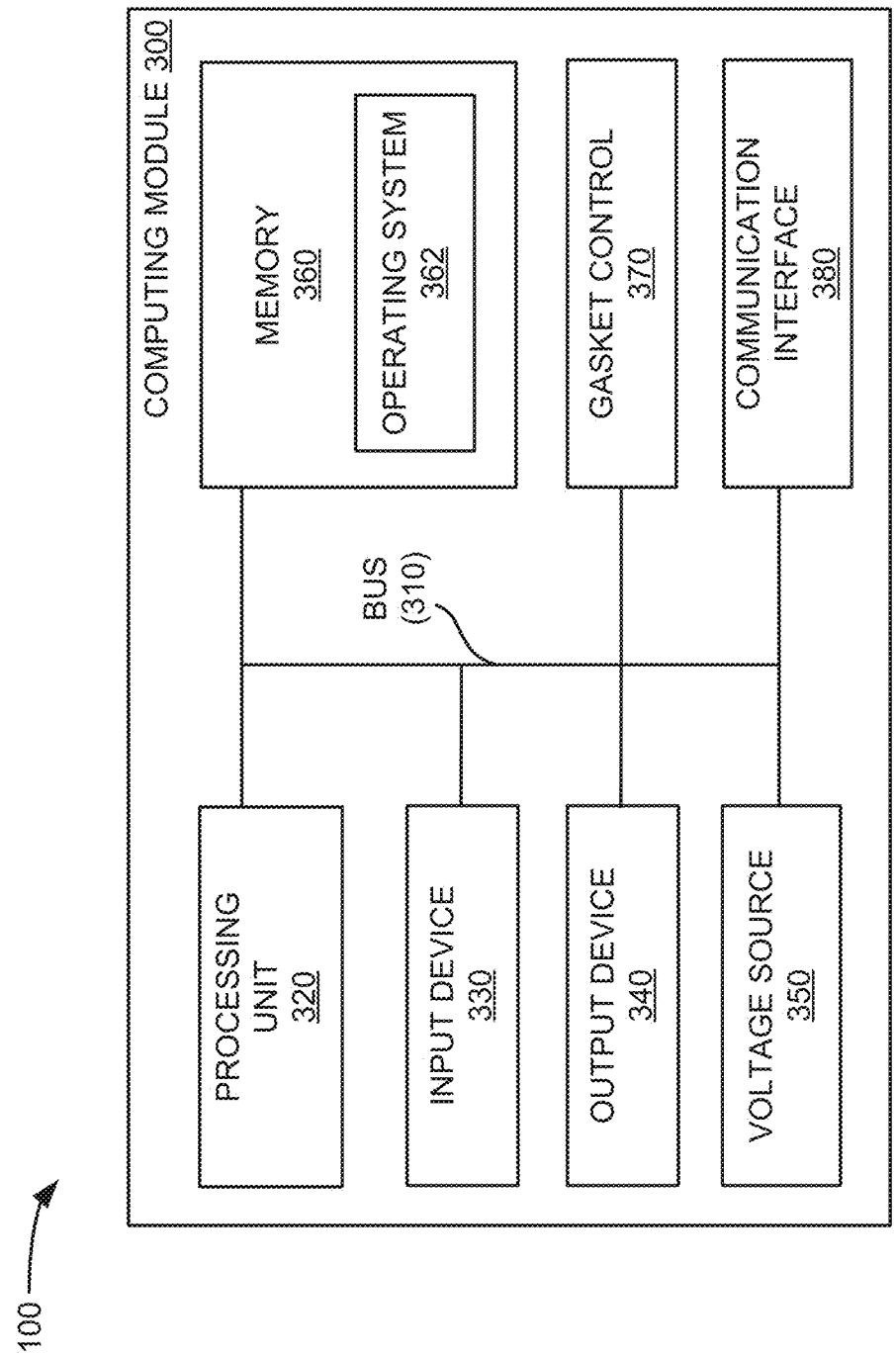
FIG. 3 is a block diagram of exemplary components of a the electronic device of FIG. 2.

FIG. 3 is a block diagram of exemplary components of a computing module 300. Electronic device 100 may include one or more computing modules 300. As shown, computing module 300 may include a bus 310, processing unit 320, an input device 330, an output device 340, a voltage source 350, a memory 360, gasket control 370, and a communication interface 380. Computing module 300 may include other components (not shown) that aid in receiving, transmitting, and/or processing data. Moreover, other configurations of components in computing module 300 are possible.

Bus 310 may include a path that permits communication among the components of computing module 300. Processing unit 320 may include any type of processor or microprocessor (or groups of processors or microprocessors) that interprets and executes instructions. In some implementations, processing unit 320 may include one or more application-specific integrated circuits (ASICs) or field-programmable gate arrays (FPGAs).

Input device 330 may include a device that permits a user to input information into computing module 300, such as a keyboard (e.g., control keys 240 or a keypad), a mouse, a pen, a microphone (e.g., microphone 250), a camera, a touch-screen display (e.g., display 230), etc. Output device 340 may output information to the user, such as a display (e.g., display 230), a speaker (e.g., speaker 220), etc. Input device 330 and output device 340 may allow the user to receive and view a menu of options and select from the menu options. The menu may allow the user to select the functions or services associated with operations and/or applications executed by computing module 300.

Voltage source 350 may include a voltage or power source, such as a DC voltage source, within electronic device 100. Voltage source 350 may be associated with powering components of electronic device 100. As an example, voltage source 350 may be located in series with a power supply (e.g., a battery) that may represent the primary power source associated with powering electronic device 100. In one implementation, voltage source 350 may include a separate step-up voltage generator to provide a higher voltage, necessary to change a shape of gasket 110, than what is normally used for powering other parts of the electronic device 100.

Memory 360 may include a random access memory (RAM) or another type of dynamic storage device that may store information and instructions, e.g., an application, for execution by processing unit 320; a read-only memory (ROM) device or another type of static storage device that may store static information and instructions for use by processing unit 320; or some other type of magnetic or optical recording medium and its corresponding drive, e.g., a hard disk drive (HDD), a solid state drive (SSD) or memory, for storing information and/or instructions.

Memory 360 may also include an operating system 362. Operating system 362 may include software instructions for managing hardware and software resources of the device. In the case of electronic device 100, operating system 362 may include Android, Symbian, iOS, Windows Mobile, etc. Operating system 362 may include a user interface to manage operations of electronic device 100, such as locking and unlocking gaskets for covered openings.

Gasket control 370 may include circuitry to selectively apply voltage from voltage source 350 to one or more EAP gaskets (e.g., gasket 110) in covered openings. For example, gasket control 370 may receive signals from processing unit 320, based on user input to menus from operating system 362, to apply voltage to gasket 110 to allow for opening or closing of door 120. Gasket control 370 may also monitor the status (e.g., opened/closed) of door 120 to distinguish between an opening and a closing action. For example, gasket control 370 may apply voltage to gasket 110 for different durations to either open door 120 or close door 120. In another implementation, one or more sensors may be included in door 120 and/or housing 210 to indicate the status (e.g., opened/closed) of door 120. Gasket control 370 may use indications from the one or more sensors to determine when to apply and release voltage to gasket 110.

Communication interface 380 may include a transceiver that enables computing module 300 to communicate with other devices or systems. Communications interface 380 may include a network interface card, e.g., Ethernet card, for wired communications or a wireless network interface (e.g., a WiFi) card for wireless communications. Communication interface 380 may also include, for example, a universal serial bus (USB) port for communications over a cable, a Bluetooth™ wireless interface for communicating with Bluetooth devices, a near-field communication (NFC) interface, a broadband cellular interface for 3G or 4G wireless communications, etc.

Computing module 300 may perform certain operations described herein in response to processing unit 320 executing software instructions of an application contained in a computer-readable medium, such as memory 360. A computer-readable medium may include a tangible, non-transitory memory device. A memory device may include space within a single physical memory device or spread across multiple physical memory devices. The software instructions may be read into memory 360 from another computer-readable medium or from another device via communication interface 380. The software instructions contained in memory 360 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

FIGS. 4A-4D are simplified cross-sectional schematics illustrating use of a watertight access cover 400 according to an implementation described herein. Watertight access cover 400 may correspond to, for example, openings of electronic device 100 such as USB port 260, slot 270, and/or audio port 280. Referring collectively to FIGS. 4A-4D, watertight access cover 400 may include gasket 110 mounted to door 120 within an opening 410 of housing 210.

Gasket 110, as discussed above, may include an EAP material that changes physical dimensions and/or shape when placed in an electric field or when voltage is applied. For example, in an exemplary implementation, gasket 110 may include a dielectric EAP material or an ionic EAP material that contracts within opening 410 when voltage is applied to a top portion of gasket 110, labeled 402 in FIG. 4A. A conductive disk (or electrode) 420 may include a metallic disk that connects to the top side of gasket 110, as illustrated in FIGS. 4A-4D. Additionally, or alternatively, a conductive disk (or electrode) 430 may include a metallic disk that connects to the bottom side of gasket 110, as further illustrated in FIGS. 4A-4D. In other implementations, instead of conductive discs 420 or 430, conductive printing or other application methods may be used to apply a conductive layer onto one or more portions of gasket 110.

Figure 4A:
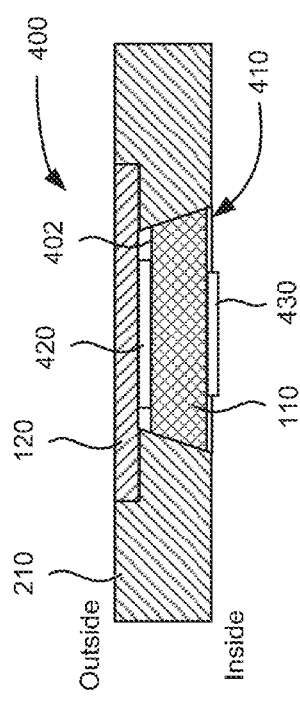

As shown in FIG. 4A, in a closed position, watertight access cover 400 positions gasket 110 within opening 410. Gasket 110 may be configured with slightly larger dimensions than that of opening 410, such that gasket 110 forms a watertight seal within opening 410 when gasket is in a normal state (e.g., when voltage is not applied). Gasket 110 and opening 410 may be configured so that the normal state of gasket 110 locks gasket 110 within opening 410. For example, as shown in FIGS. 4A-4D, walls 412 and 414 of opening 410 may taper slightly inward to gradually narrow opening 410 as opening 410 extends from the inside to the outside of housing 210. The shapes of gasket 110 and opening 410 are for illustrative purposes. Other shapes and/or configurations of gasket 110 and opening 410 may be used to ensure opening 410 is sealed and door 120 is locked when gasket 110 is in a normal state (e.g., when voltage is not applied).

Figure 4B:
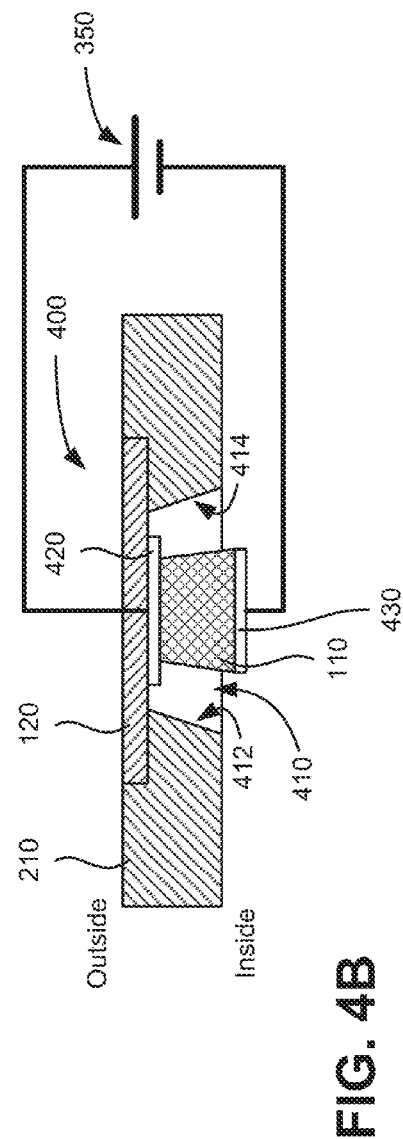

Referring to FIG. 4B, voltage source 350 may apply voltage to gasket 110 to change the shape of gasket 110. For example, in an activated state (e.g., when voltage is applied) gasket 110 may contract from walls 412 and 414 of opening 410, removing the seal and interference to allow door 120 to open.

Referring to FIG. 4C, a force may be applied to open door 120 while gasket 110 remains in an activated state. For example, voltage source 350 may continue to apply voltage to gasket 110 for a sufficient period of time to allow gasket 110 to clear opening 410. In one implementation, the force may be applied by a spring 440. Spring 440 may include, for example, a coil spring, a leaf spring, torsion spring, etc. In another implementation, the force may be applied manually (e.g., by a user).

Referring to FIG. 4D, after door 120 is opened, voltage from voltage source 350 may be removed and gasket 110 may return to a normal state. In this implementation, the shape change back to the normal state may prevent door 120 from closing, since gasket 110 cannot be inserted into opening 410 in the normal state. Thus, when a user is ready to close door 120, voltage source 350 may again apply voltage to gasket 110 to change the shape of gasket 110. The limited duration of applied voltage to gasket 110 may reduce power consumption for electronic device 100.

Although FIGS. 4A-4D show exemplary components of watertight access cover 400, in other implementations, watertight access cover 400 may contain fewer, different, differently-arranged, or additional components than depicted in FIG. 4. Alternatively, or additionally, one or more components of watertight access cover 400 may perform one or more other tasks described as being performed by one or more other components of watertight access cover 400. For example, in one implementation spring 440 may provide a conductive path for voltage to gasket 110.

FIGS. 5A-5B are diagrams of an exemplary user interface 500 that may be presented on electronic device 100 to control a watertight access cover 400 according to an implementation described herein. User interface 500 may be provided, for example, as part of operating system 362, gasket control 370, or another functional component of electronic device 100. As shown in FIGS. 5A-5B, user interface 500 may provide selectable options to lock/unlock one or more watertight access covers 400 of electronic device 100. For example, user interface 500 may provide a cover control icon 510 as part of an options menu. Cover control icon 510 may be selected by a user to initiate an opening or closing action for one or more watertight access covers 400.

Referring to FIG. 5A, a cover selection menu 520 may be generated by electronic device 100 when a user selects cover control icon 510. Cover selection menu 520 may include, for example, a list of watertight access covers 400 that are available to open/close on electronic device 100. As shown in FIG. 5A, electronic device 100 may include access covers for an "audio jack," a "SIM card" (e.g., for a subscriber identity module card slot), a "USB Port", and an "SD Card" (e.g., for a secure digital card slot) that may be opened/closed. In one implementation, cover selection menu 520 may also include an inclusive selection option (e.g., "All") to open/close all covers. A user may select one or more of the options from cover selection menu 520 to indicate a particular watertight access cover(s) 400 to open on electronic device 100. For example, a user may select the "SIM Card" option in cover selection menu 520.

Referring to FIG. 5B, selection of the "SIM Card" option in cover selection menu 520 may cause electronic device 100 to apply voltage to one of gaskets 110 and release door 120 of watertight access cover 400. In one implementation, electronic device 100 may present a confirmation menu 530 to notify a user of the status (e.g., open/closed) of a particular watertight access cover 400. Confirmation menu 530 may for example, prompt a user to confirm an action to open a cover (e.g., "OK") or re-close the cover (e.g., "CLOSE"). In another implementation, confirmation menu 530 (or a similar menu) may include additional information to indicate that electronic device 100 is not waterproof if watertight access cover 400 is not closed. In still another implementation, confirmation menu 530 may be presented when electronic device 100 detects that watertight access cover 400 is open and the corresponding port is not in use.

Although FIG. 5 shows an exemplary user interface 500, in other implementations, user interface 500 may contain different, differently-arranged, or additional information than depicted in FIG. 5. Alternatively, or additionally, electronic device 100 may provide a different form of user interface to control watertight access covers 400. For example, in another implementation, electronic device 100 may provide dedicated control buttons or keypad commands, or voice-activated commands, to open/close watertight access covers 400. As another alternative, one or more sensors on access cover 400 may sense a user's touch and may automatically activate gasket control 370 to open or close a particular access cover 400.

FIG. 6 is a flowchart of an exemplary process 600 for controlling a watertight access cover according to an implementation described herein. In one implementation, process 600 may be performed, for example, by electronic device 100. In another implementation, one or more parts of process 600 may be performed by electronic device 100 in conjunction with another device or a user.

Process 600 may include presenting a user interface to control an access cover (block 610) and receiving a user's input to open an access cover (block 620). For example, electronic device 100 may present user interface 500 to control watertight access cover 400. A user may select an icon (e.g., cover control icon 510) to cause electronic device 100 to present a list of access covers that may be opened (e.g., cover selection menu 520). Electronic device 100 may receive via a user interface 500, a user's selection to open one of the access covers.

Process 600 may also include applying voltage to alter a shape of an EAP gasket for the access cover (block 630). For example, upon receive a command via user interface 500, electronic device 100 (e.g., gasket control 370) may apply voltage from voltage source 350 to alter a shape of gasket 110 for watertight access cover 400. The shape of gasket 110 may be altered from a normal state that blocks movement of watertight access cover 400 to an activated state that permits opening of watertight access cover 400.

Process 600 may additionally include receiving a force to open the access cover (block 640) and removing the applied voltage (block 650). For example, spring 440 may exert a force on door 120 of watertight access cover 400 when door 120 is in a closed position. Spring 440 may push open door 120 to remove watertight access cover 400 (including gasket 110 and door 120) from opening 410. After a brief period of time (or after an indication from a sensor), electronic device 100 (e.g., gasket control 370) may remove the applied voltage from voltage source 350, thus allowing gasket 110 to return to its normal state.

Still referring to FIG. 6, process 600 may further include receiving a user's input to close an access cover (block 660), applying voltage to alter a shape of an EAP gasket for the access cover (block 670), receiving a force to close the access cover (block 680), and removing the applied voltage (block 690). For example, to close a particular watertight access cover 400, a user may again access user interface 500 on electronic device 100 to indicate that watertight access cover 400 is to be closed. Electronic device 100 (e.g., gasket control 370) may again apply voltage from voltage source 350 to alter a shape of gasket 110 for watertight access cover 400. The shape of gasket 110 may again be altered from a normal state, which prevents insertion of gasket 110 into opening 410, to an activated state, which permits closing of watertight access cover 400. Once gasket 110 is in the activated state, a manual or mechanical force may be applied to place watertight access cover 400 into opening 410. Electronic device 100 (e.g., gasket control 370) may again remove the applied voltage to return gasket 110 to its normal state and lock/seal watertight access cover 400.

In one implementation, electronic device 100 (e.g., gasket control 370) may use different timing schemes to apply voltage to open watertight access cover 400 and close watertight access cover 400. For example, the amount of time to apply voltage to gasket 110 in order to open door 120 may be less than one second when spring (e.g., spring 440) is configured to automatically push open door 120. Conversely, the amount of time to apply voltage to gasket 110 in order to close access cover 400 may be one to several seconds when manual force or mechanical forces are used to close door 120.

FIGS. 7A and 7B provide simplified cross-sectional schematics illustrating use of a watertight access cover 700 according to another implementation described herein. Similar to watertight access cover 400 described above, watertight access cover 700 may correspond to openings of electronic device 100 such as USB port 260, slot 270, and/or audio port 280. Referring collectively to FIGS. 7A and 7B, watertight access cover 700 may include a gasket 710 and a door 720 mounted within an opening 730 of housing 210.

Similar to gasket 110 described above, gasket 710 may include an EAP material that changes physical dimensions and/or shape when placed in an electric field or when voltage is applied. In the configuration of FIGS. 7A and 7B, gasket 710 may include a dielectric EAP material or an ionic EAP material that contracts away from opening 730 when voltage is applied to a portion of gasket 710. One or more electrodes (not shown) may connect gasket 710 to applied voltage from voltage source 350. Thus, watertight access cover 700 may be controlled with components of computing module 300 described above.

As shown in FIG. 7A, in a closed position, watertight access cover 700 positions gasket 710 around opening 730. Gasket 710 may be configured with slightly smaller interior perimeter, P1, than an outside perimeter of door 720, such that gasket 710 forms a watertight seal around door 720 when gasket is in a normal state (e.g., when voltage is not applied). In one implementation, gasket 710 may be secured to housing 210 to form a watertight seal between housing 210 and gasket 710. Gasket 710 and door 720 may be configured so that the normal state of gasket 710 locks door 720 over opening 730. The shapes of gasket 710, door 720, and opening 730 shown in FIG. 7A are for illustrative purposes. Other shapes and/or configurations of gasket 710, door 720, and opening 730 may be used to ensure opening 730 is sealed and door 720 is locked when gasket 710 is in a normal state (e.g., when voltage is not applied).

Referring to FIG. 7B, voltage source 350 may apply voltage to gasket 710 to change the shape of gasket 710. For example, in an activated state (e.g., when voltage is applied) the internal perimeter P2 of gasket 710 may increase to become larger than that of the outside perimeter of door 720, removing the seal and interference to allow door 720 to open. In one implementation, a telescoping spring 740 may provide a force to push door 720 away from opening 730 and past gasket 710. Additionally, or alternatively, door 720 may include a finger hold to allow a user to manually lift door 720 after gasket 710 changes shape.

FIGS. 8A and 8B provide simplified cross-sectional schematics illustrating use of a watertight access cover 800 according to another implementation described herein. Similar to watertight access covers 400 and 700 described above, watertight access cover 800 may correspond to openings of electronic device 100 such as USB port 260, slot 270, and/or audio port 280. As shown in FIGS. 8A and 8B, watertight access cover 800 may include a gasket 810 mounted to a door 820 within an opening 830 of housing 210. FIG. 8C provides a top view of door 820 with attached gasket 810 in a normal state.

Similar to gaskets 110 and 710 described above, gasket 810 may include an EAP material that changes physical dimensions and/or shape when placed in an electric field or when voltage is applied. In the configuration of FIGS. 8A and 8B, gasket 810 may change shape to simultaneously unlock watertight access cover 800 and force door 820 out of opening 830 when voltage is applied to a portion of gasket 810. One or more electrodes (not shown) may connect gasket 810 to applied voltage from voltage source 350. Thus, watertight access cover 800 may be controlled with components of computing module 300 described above.

As shown in FIG. 8A, in a closed position, watertight access cover 800 positions gasket 810 within a channel 835 around opening 830. Gasket 810 may be secured to door 820 in a watertight configuration. Gasket 810 may be configured with slightly larger outside diameter than an outside diameter of channel 835, such that gasket 810 forms a watertight seal around opening 830 when gasket is in a normal state (e.g., when voltage is not applied).

Referring to FIG. 8B, voltage source 350 may apply voltage to gasket 810 to change the shape of gasket 810. For example, in an activated state (e.g., when voltage is applied) outside diameter of gasket 810 may decrease to allow door 820 to open. In one implementation, the change in shape of gasket 810 may force door 720 out of opening 730. Thus, in the configuration of FIG. 8B, watertight access cover 800 may not require additional springs to move door 820 out of opening 830. Additionally, or alternatively, door 820 may include a finger hold to allow a user to manually lift door 820 after gasket 810 changes shape.

FIGS. 9A and 9B provide simplified cross-sectional schematics illustrating use of a watertight access cover 900/950 according to further implementations described herein. Watertight access cover 900/950 may correspond to an opening of electronic device 100 for a modular connection. As shown in FIG. 9A, watertight access cover 900 may include gasket 810 mounted to door 820 within an opening 930 of housing 210. Watertight access cover 900 and opening 930 may be sized to accommodate, for example, insertion of a functional module 940 into a cavity inside electronic device 100. Functional module 940 may include, for example, a wireless modem, additional RAM, or another module that may expand the capabilities of electronic device 100. In the configuration of FIG. 9A, functional module 940 may be a separate component from watertight access cover 900. In another configuration (not shown), functional module 940 may be integral with gasket 710 and door 720 such that functional module 940, gasket 710, and door 720 are a single component. In the configuration of FIG. 9A, opening 930 can operate, for example, as an expansion bay to alternatively receive any one of multiple functional modules 940 with a watertight seal. Voltage (e.g., from voltage source 350, not shown in FIG. 9A) may be applied to gasket 810 to allow insertion/extraction of watertight access cover 900 and functional module 940 to/from opening 930.

As shown in FIG. 9B, watertight access cover 950 may include gasket 710 and a door 920 mounted within opening 935 of housing 210. Watertight access cover 950 may further include functional module 940 that may plug into an interface of electronic device 100. As shown in FIG. 9B, in a closed position, watertight access cover 950 positions gasket 710 within opening 935. Gasket 710 may be secured to door 920 in a watertight configuration and form a watertight seal around opening 935 when gasket is in a normal state (e.g., when voltage is not applied). Functional module 940 may connect through opening 930 to an interface inside electronic device 100 to provide a waterproof expansion component. Voltage (e.g., from voltage source 350, not shown in FIG. 9B) may be applied to gasket 710 to allow insertion and extraction of watertight access cover 950 at opening 935.

Systems and/or methods described herein may provide effective watertight seals for openings in electronic devices. In one implementation, an electronic device includes a housing that has an opening to access a component inside the housing. The electronic device also includes a cover for the opening, a gasket to provide a seal between the cover and the opening, and a voltage source to supply voltage to the gasket. The gasket is configured to alter its shape, from a normal state that blocks opening of the cover to an activated state that permits opening of the cover, when voltage is applied to the material.

The foregoing description of implementations provides illustration, but is not intended to be exhaustive or to limit the implementations to the precise form disclosed. Modifications and variations are possible in light of the above teachings or may be acquired from practice of the teachings.

In the above, while a series of blocks has been described with regard to the exemplary processes, the order of the blocks may be modified in other implementations. In addition, non-dependent blocks may represent acts that can be performed in parallel to other blocks. Further, depending on the implementation of functional components, some of the blocks may be omitted from one or more processes.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "component" that performs one or more functions. This component may include hardware, such as a processor, a microprocessor, an application specific integrated circuit, or a field programmable gate array, software, or a combination of hardware and software.

The term "comprises/comprising" when used in this specification is taken to specify the presence of stated features, integers, steps or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. An electronic device, comprising:
    a housing that includes an opening to access a component inside the housing;
    a cover for the opening;
    a gasket that has:
        a first, uncompressed shape and size state that occurs in an absence of a voltage applied to the gasket, the first state coordinating with at least one of the housing or the cover to lock the cover in a closed position that covers the opening and establishes a watertight seal that prevents water from reaching the component via the opening;
        a second, compressed shape and size state that occurs in a presence of the voltage applied to the gasket, the second state releasing the cover from the closed position, the released cover moveable to an open position to allow access to the component via the opening; and
    a voltage source to selectively supply the voltage to the gasket.

2. The electronic device of claim 1, wherein the gasket comprises an electroactive polymer (EAP).

3. The electronic device of claim 1, further comprising:
    a user interface that presents, to a user, a menu option to open the cover and receive a selection from the user to open the cover, wherein user selection of the menu option triggers application of the voltage from the voltage source to alter the gasket from the first state to the second state.

4. The electronic device of claim 1, wherein the gasket is secured to the cover and moves with the cover between the open position and the closed position.

5. The electronic device of claim 4, wherein the cover includes an electrode through which the voltage is supplied to the gasket.

6. The electronic device of claim 1, further comprising a spring that forces the cover to the open position during application of the voltage to the gasket.

7. The electronic device of claim 1, wherein the gasket is secured to the housing and is separated from the cover when the cover is opened.

8. The electronic device of claim 1, wherein the component is one or more of an audio jack, a USB port, a subscriber identity module (SIM) card slot, a memory card slot, or a cavity in which a functional module is received.

9. A method performed by an electronic device, comprising:
    presenting, to a user and via a user interface, a menu option to open an access cover of the electronic device, the access cover covering an opening of a housing of the electronic device, a component of the electronic device accessible via the opening;

receiving, via a user interface, a selection to open the access cover;

applying a voltage to alter a shape or size of a gasket for the access cover, wherein the shape or size of the gasket is altered from a normal state that blocks opening of the access cover to an activated state that permits opening of the access cover; and applying, while the voltage is being applied to alter the shape or size of the gasket, a force to remove the access cover from the opening.

10. The method of claim 9, wherein the menu option identifies the access cover from a selection of multiple access covers.

11. The method of claim 9, further comprising:

removing, after the force to remove the access cover has been applied, the voltage to return the gasket from the activated state to the normal state.

12. The method of claim 11, further comprising:

receiving, from the user and via the user interface, another selection to close the access cover;

applying voltage to alter the shape or size of the gasket, wherein the shape or size of the gasket is altered from the normal state to the activated state; and receiving, while the voltage is being applied to alter the shape or size of the gasket, a force to insert the access cover onto the opening.

13. The method of claim 9, wherein the gasket comprises an electroactive polymer (EAP).

14. A device, comprising:

a housing that includes an opening to access a component inside the housing;

a cover for the opening;

a gasket to provide a seal between the cover and the opening, wherein the gasket comprises an electroactive polymer (EAP) material configured to alter a shape or size, from a normal state that blocks opening of the cover to an activated state that permits opening of the cover, when voltage is applied to the gasket;

an electrode to connect the gasket to a voltage source to selectively supply voltage to the gasket;

a memory to store a plurality of instructions; and a processor that, by execution of the instructions, is configured to:

present, to a user and via a user interface, a menu option to open the cover, receive, via the user interface, a selection to open the cover, and apply voltage, from the voltage source and based on the selection, to alter the shape or size of the gasket from the normal state to the activated state.

15. The device of claim 14, wherein the processor is further configured to:

present, to a user and via a user interface, options to identify the cover from a group of multiple covers.

16. The device of claim 15, wherein the processor is further configured to:

monitor a status of the cover as one of opened or closed.

17. The device of claim 14, wherein the device comprises one of:

a mobile telephone,
a tablet computer,
a laptop computer,
a personal digital assistant (PDA),
a gaming device,
a personal music playing device,
a Global Positioning System (GPS) device,
a digital camera, or
a two-way radio device.

* * * * *